(12) United States Patent
Pannell (10) Patent No.: US 8,937,974 B1
(45) Date of Patent: Jan. 20, 2015

(54) SYSTEM AND METHOD FOR DETERMINING A MARGIN OF LATENCY WITHIN A DEVICE

(71) Applicant: Marvell International Ltd., Hamilton (BM)

(72) Inventor: Donald Pannell, Cupertino, CA (US)

(73) Assignee: Marvell International Ltd., Hamilton (BM)

( * ) Notice: Subject to any disclaimer, the term of this patent is extended or adjusted under 35 U.S.C. 154(b) by 75 days.

(21) Appl. No.: 13/873,732

(22) Filed: Apr. 30, 2013

Related U.S. Application Data

(60) Provisional application No. 61/641,415, filed on May 2, 2012.

(51) Int. Cl.
| | |
|---|---|
| *G06F 11/00* | (2006.01) |
| *G08C 15/00* | (2006.01) |
| *G06F 3/00* | (2006.01) |
| *G06F 15/173* | (2006.01) |
| *G06F 13/38* | (2006.01) |
| *H04L 1/18* | (2006.01) |
| *H04L 12/26* | (2006.01) |
| *H04L 12/841* | (2013.01) |

(52) U.S. Cl.
CPC ............ *G06F 13/385* (2013.01); *H04L 1/1887* (2013.01); *H04L 43/106* (2013.01); *H04L 47/283* (2013.01)

USPC .............. 370/516; 370/230; 709/224; 710/30

(58) Field of Classification Search
CPC .... H04L 1/1887; H04L 43/106; H04L 47/283
USPC ...................... 370/516, 230; 710/30; 709/224
See application file for complete search history.

(56) References Cited

U.S. PATENT DOCUMENTS

| 7,924,711 B2 * | 4/2011 | Rosen ........................ 370/230 |
| 8,171,152 B2 * | 5/2012 | White et al. ................ 709/231 |
| 8,838,787 B2 * | 9/2014 | Gelter et al. ............... 709/224 |

* cited by examiner

*Primary Examiner* — Eric Oberly (57) ABSTRACT

A system including a receiving module in a device and receiving samples of data transferred from a data source. A memory stores the samples and timestamps when the data was sampled. A host module builds a frame including the samples based on a first timestamp and a predetermined latency period between the first timestamp and a second timestamp in a descriptor of the frame. The second timestamp indicates a time when the frame is expected to be received by a MAC module. A transfer module transfers the frame to the MAC module according to the second timestamp. A detector module determines a margin of latency based on a difference between a time subsequent to when the frame is finished being built and a time when the frame is received at the MAC module. The detector module updates the first predetermined latency period based on the determined margin of latency.

19 Claims, 4 Drawing Sheets

SYSTEM AND METHOD FOR DETERMINING A MARGIN OF LATENCY WITHIN A DEVICE

CROSS-REFERENCE TO RELATED APPLICATIONS

This application claims the benefit of U.S. Provisional Application No. 61/641,415, filed on May 2, 2012. The entire disclosure of the application referenced above is incorporated herein by reference.

FIELD

The present disclosure relates to networks, and more particularly to latencies of data sources in a network.

BACKGROUND

A data communication network may include multiple talkers (or sources of data) and multiple receivers. Any number of bridges (or switches) may be connected between each of the talkers and the receivers. The data communication network may be an arbitrary network (referred to as a non-engineered network) or non-arbitrary network (referred to as an engineered network). An arbitrary network may be, for example, a residential local area network (LAN), which may have different network devices (e.g., computers, cellular phones, televisions, printers, and electronic tablets) arbitrarily connecting and disconnecting at various points in the network and at random times. The network devices may connect and disconnect at any time regardless of the priority levels of data being transmitted in the arbitrary network.

A non-arbitrary network may be, for example, an automotive network within a vehicle or a manufacturing assembly line network. In general, network devices in a non-arbitrary network are fixed and are not being connected and/or disconnected from the non-arbitrary network. Although network devices may be connected to and/or disconnected from a non-arbitrary network, communication with a network device that is being connected to or disconnected from the non-arbitrary network is given lower priority during transmission periods of high-priority data. During these transmission periods, high-priority data is transmitted between network devices in the non-arbitrary network.

For example, a non-arbitrary Ethernet network that is operating according to Institute of Electrical and Electronics Engineers (IEEE) 802.1 Qav may include a talker (or source), multiple bridges and a listener (or receiver). The talker may transmit high-priority data to the listener over the bridges during allocated transmission periods of periodic transmission time intervals. High-priority data may refer to, for example, Class A or Class B data with low-latency requirements. The term latency may refer to time for a high-priority frame to be transmitted through one or more hops of the non-arbitrary network. The latency of a single hop is measured from a time when a last bit of a high-priority frame is received by a network device for that hop to a time when the last bit is transmitted from the network device. Simply stated, the latency of a single hop is measured from the last bit into the network device to the last bit out of the network device. A single hop may refer to a talker (referred to as an end station) or a bridge of the non-arbitrary network.

In a non-arbitrary Ethernet network, transmitted data may have, for example, one of three to eight priority levels. Class A data may include audio video bridging (AVB) data with a highest priority level. The highest priority is used to insure the lowest latency. Although AVB data may include audio data and/or video data, AVB data may also include control data, user data, reference data, or other types of data. The highest priority level data may be provided with a predetermined amount of bandwidth and a predetermined maximum latency. This assures that the Class A data is transmitted during allocated time periods and latency associated with transmitting the Class A data over a predetermined number of hop(s) and/or between end stations is less than the predetermined maximum latency. Class B data may be AVB data with a next highest priority level. All Non-AVB data use the remaining lower priority levels. In general, higher priority data is transmitted before lower priority data. If a device supports less than the maximum eight priority levels the IEEE 802.1 Qav standard defines how the eight external priorities are to be mapped to the number of priorities supported by the device. In all cases Class A is the highest.

The IEEE AVB standards support guaranteed bandwidth and latency for properly reserved AVB streams over various networking media such as Ethernet (IEEE 802.3). One of these standards, IEEE 1722, requires that talkers insert a respective 'presentation time' into each frame of a stream of data. Presentation times are inserted into the stream of data if frames of the data contain media samples (e.g., audio) that need to be played back in a listener at a certain media clock rate of the stream of data. This allows a listener to be able to play back the stream of data without buffer underflow or overflow issues at the listener.

As an example, a host control module of a talker may determine a presentation time for a frame of a data stream and incorporate the presentation time in the frame prior to transmitting the frame to a listener. The presentation time may refer to (i) a time when a specific sample in a frame is to be received by a medium access control (MAC) module of a listener, (ii) a time when the sample is to be played out at the listener, or (iii) a time between when the sample is received by the MAC module of the listener and the time when the sample is played out at the listener. The presentation times of the data stream define the media clock rate for the data stream.

AVB Class A frames, which are defined in the generation 1 (Gen 1) AVB standards, are designed to pass through 7 hops (e.g., six network wire links) of Ethernet devices in under 2 milli-seconds (mSec). As such, a talker may set a default 'presentation time' for a Class A frame a predetermined period (e.g., 2 mSec) from when a MAC module of the talker is to transmit the Class A frame to a listener. The predetermined period is used to compensate for a worst case latency of a network between the talker and the listener. The latency of the network may begin when the MAC module receives a frame.

SUMMARY

A system is provided and includes a receiving module, a memory, a medium access control (MAC) module, and a host module. The receiving module is in a device and is configured to receive samples of data transferred from a data source to the device. The memory is configured to store (i) the samples of data, and (ii) timestamps when the data was sampled. The host module is configured to build a frame based on one of the timestamps and a first predetermined latency period between (i) the one of the timestamps and (ii) a timestamp in a descriptor of the frame. The frame includes the samples of data and the descriptor. The timestamp in the descriptor indicates a time when the frame is expected to be received by the MAC module. The transfer module is configured to transfer the frame to the MAC module according to the timestamp in the descriptor. The latency detector module is configured to determine a margin of latency based on a difference between (i) a time subsequent to when the host module has finished building the frame and (ii) a time when the frame is received at the medium access control module. The latency detector module updates the first predetermined latency period based on the determined margin of latency.

In other features, a method is provided and includes receiving samples of data transferred from a data source to a device. The method further includes storing, in a memory, (i) the samples of data, and (ii) timestamps when the data was sampled. A frame is built at a host module based on one of the timestamps and a first predetermined latency period between (i) the one of the timestamps and (ii) a timestamp in a descriptor of the frame. The frame includes the samples of data and the descriptor. The timestamp in the descriptor indicates a time when the frame is expected to be received by a medium access control module of the device. The frame is transferred to the medium access control module according to the timestamp in the descriptor. A margin of latency is determined based on a difference between (i) a time subsequent to when the host module has finished building the frame and (ii) a time when the frame is received at the medium access control module. The first predetermined latency period is updated based on the determined margin of latency.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

In the drawings, reference numbers may be reused to identify similar and/or identical elements.

DESCRIPTION

A talker may include a receiving module, a host control module and a network interface module. The receiving module may receive frames from a source and store the frames in a memory. The host control module may process and/or transfer the frames from the memory to a listener via the transmitting module. Frame processing and transfer latencies can exist within a talker. For example, latencies can exist between the receiving module and the network interface module due to storage, processing and transfer times of the receiving module and the host control module.

The network interface module may insert a 'presentation time' into a frame. The presentation time is set a predetermined period (e.g., 2 mSec) subsequent to when the frame is to be transmitted (or attempted to be transmitted) from a MAC module of the network interface module. A margin of latency can exist and refers to an amount of time between (i) when the host control module has completed processing the frame, and (ii) a time when ownership of the frame is transferred to the MAC module. To minimize latencies within the Talker, the following disclosed implementations minimize margins of latency while preventing late delivery of frames to a listener.

Figure 1:
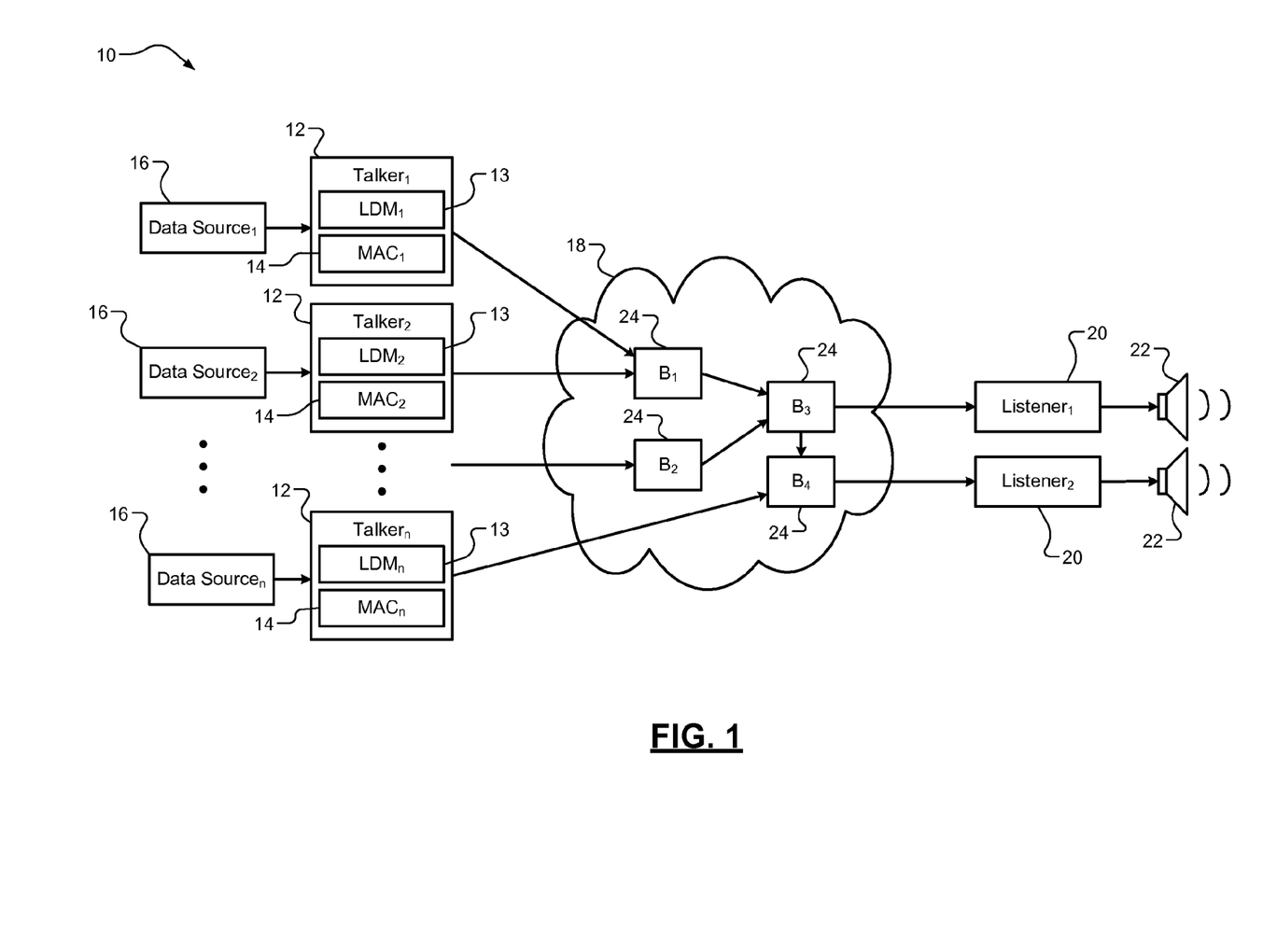
FIG. 1 is a functional block diagram of a non-arbitrary network incorporating talkers with MAC modules in accordance with an embodiment of the present disclosure.

FIG. 1 shows a non-arbitrary network 10 incorporating talkers 12 with latency detector modules 13 and medium access control (MAC) modules 14. Each of the talkers 12 may receive data from one or more data sources 16, for example, microphones, storage drives (e.g., hard drives and flash drives), audio and/or video playback devices (e.g., digital versatile disc players), etc. The talkers 12 can perform shaping for each data source. This assures that each flow of data received from a data source is appropriately spaced out, since the data from the data sources can (i) end up being received at different listeners (network receive nodes of data streams), and (ii) follow different paths through a network prior to being received at the listeners. The talkers can also adjust latencies from when the data is received from the data sources 16 to when the MAC modules 14 transmit the data. This may be based on margins of latency of the talkers as detected by the latency detector modules 13.

The non-arbitrary network 10 includes the talkers 12, the data sources 16, a switching network 18 (e.g., an Ethernet cloud defined by the IEEE 802.3 standard or an AVB cloud defined by the IEEE 802.1 standard), listeners 20, and playout devices 22 (e.g., speakers). The talkers 12 receive frames of data from the data sources 16 and include the MAC modules 14. The MAC modules 14 process the frames and output the processed frames to the switching network 18. The MAC modules 14 may be time aware to process the frames based on presentation times and/or transfer times provided in the frames. The MAC modules 14 may also monitor and adjust margins of latency to minimize latencies within the talkers, as described in further detail below. The switching network 18 includes bridges 24 (or switches) that route the data to the listeners 20. The listeners 20 may play out the data on the playout devices 22.

The bridges 24 may multiplex and/or interleave data received from multiple ones of the talkers 12 and output the combined data at a data rate equal to a sum of output data rates of the talkers 12. A bridge may multiplex and/or interleave data received from multiple bridges in a similar manner. As a result, data received at a listener may be at a data rate that is faster than originally transmitted by a talker. Nevertheless, the listener is to playout the data at a same rate that the data is received by the original data source. For example, a microphone may receive and sample data at a particular rate (e.g., 44.1 kHz). A listener may then playout the data at the same particular rate on a playout device. To accomplish this, frames of the data may include presentation times, as described above.

Figure 2:
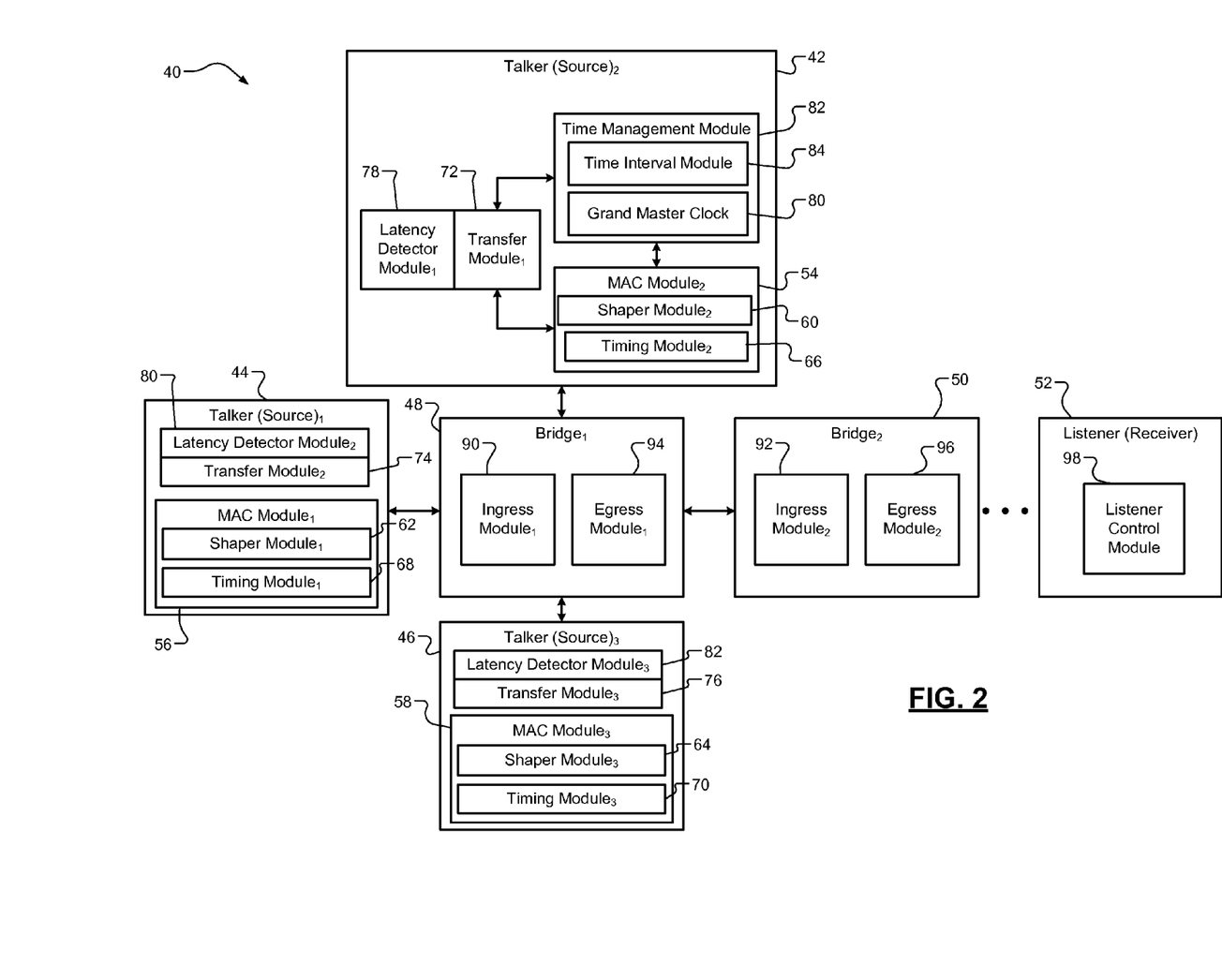
FIG. 2 is a functional block diagram of a portion of the non-arbitrary network of FIG. 1.

Referring now also to FIG. 2, which shows a portion 40 of the non-arbitrary network 10. The non-arbitrary network 10 includes talkers (three talkers 42, 44, 46 are shown), one or more bridges (two bridges 48, 50 are shown) and a listener 52. The talkers 42, 44, 46 may be referred to as data sources, as the talkers 42, 44, 46 transmit data to the listener 52. The listener 52 may be referred to as a receiver, as the listener 52 receives data from the talkers 42, 44, 46. The bridges 48, 50 may satisfy IEEE 802.1 AS, which provides precise timing protocols (PTPs). The bridges 48, 50 provide a daisy chain of network devices between end stations (e.g., the talkers 42, 44, 46 and the listener 52).

The talkers 42, 44, 46 may each include respective MAC modules 54, 56, 58, which may be time aware, as described above. Each of the MAC modules 54, 56, 58 may include respective Qav shaper modules 60, 62, 64, timing modules 66, 68, 70, transfer modules 72, 74, 76 and latency detector modules 78, 80, 82. The Qav shaper modules 60, 62, 64 may spread out transmission of AVB data (e.g., Class A data or Class B data).

One of the network devices (e.g., the second talker 42) in the network 10 may include a grand master clock 80, which generates a global clock signal. The grand master clock 80 may be located in any of the network devices of the network 10. The global clock signal may be shared with any of the network devices in the network 10. As an example, the grand master clock 80 is shown in the second talker 42, but may be located in one of the other talkers 44, 46, one of the bridges 48, 50, the listener 52, or other network device connected to the network 10. The timing modules 66, 68, 70 may generate respective local clock signals.

The network device that includes the grand master clock 80 or one of the other network devices in the network 10 may include a time management module 82. The network device having the grand master clock 80 and/or the time management module 82 may be referred to as a master device. Devices not having the grand master clock 80 and/or the time management module 82 may be referred to as slave devices. The time management module 82 may include the grand master clock 80 and/or a time interval module 84. The time interval module 84 may set the periodic transmission time interval (i.e. duration of the periodic transmission time interval) and start times of each of the periodic transmission time intervals. The global clock signal, the periodic transmission time interval and the start times of the periodic transmission time intervals may be shared between the network devices using a management information base (MIB) modules and/or a simple management network protocols (SMNPs). The time may also be communicated to each of the devices in the network by using the 802.1AS Precise Timing Protocol. The MAC modules 54, 56, 58, the Qav shaper modules 60, 62, 64, the transfer modules 72, 74, 76 and the latency detector modules 78, 80, 82 may operate based on the global clock signal.

Figure 3:
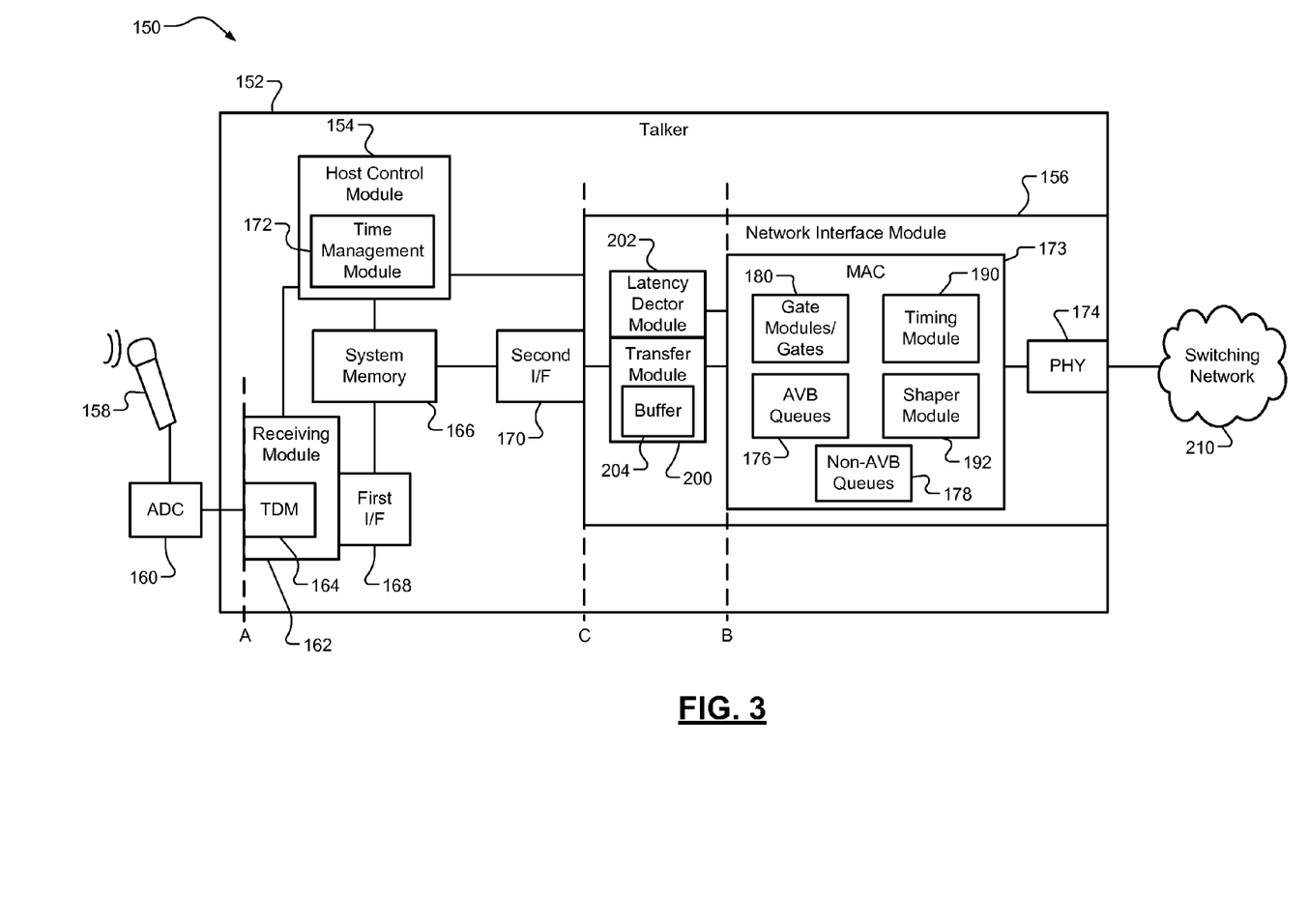
FIG. 3 is a functional block diagram of a recording network including a talker in accordance with an embodiment of the present disclosure.

The transfer modules 72, 74, 76 receive frames from respective host control modules and forward the frames to the respective MAC modules 54, 56, 58 based on descriptors of the frames. An example host control module is shown in FIG. 3. The latency detector modules 78, 80, 82 determine and minimize margins of latency within the talkers 42, 44, 46, which allows the respective overall latencies of the talkers 42, 44, 46 to be decreased. Operation of the latency detector modules 78, 80, 82 are described further below with respect to FIGS. 3-4.

The bridges 48, 50 may include respective ingress modules 90, 92 and egress modules 94, 96. The ingress modules 90, 92 may receive data from an upstream device, such as a talker or other bridge and forward the data to the egress modules 94, 96. The egress modules 94, 96 may perform data shaping (spreading out of the data) and/or forward the data to a downstream device, such as another bridge or listener.

The listener 52 receives data from the talkers 42, 44, 46 via the bridges 48, 50. The listener 52 may include a listener control module 98. The listener control module 98 may operate and/or monitor or operate one or more sensors, motors, actuators, or other devices of the network based on the data received from the talkers 42, 44, 46. The listener 52 may playout the data on a playout device (e.g., one of the playout devices 22 of FIG. 1).

The talkers 42, 44, 46, bridges 48, 50, and/or listener 52 may communicate with each other via wired or wireless connections and/or mediums. The wireless connections and/or mediums may satisfy, for example, IEEE standards 802.11, 802.11a, 802.11b, 802.11g, 802.11h, 802.11n, 802.16, and 802.20.

FIG. 3 shows a recording network 150 including a talker 152. The talker 152 may be, for example, one of the talkers 12, 42, 44, 46 of FIG. 1 or 2. The talker 152 includes a host control module 154 and a network interface module 156. The host control module 154 may include, for example, a processor and receive data of different priority levels from a data source 158 (shown as a microphone in this example) and provide the data to the network interface module 156. The data may include Class A data, Class B data, and non-AVB data.

The data source 158 generates an output signal, which may be sampled by an analog-to-digital converter 160 and provided to a receiving module 162, which may include a time-division multiplexer (TDM) 164. Reception of the samples of data at the TDM 164 occurs at plane A. The receiving module and/or the TDM 164 multiplexes and timestamps the sampled data and provides the multiplexed data and timestamps to a system memory 166 via a first interface 168. Each of the timestamps identifies a time when a sample crosses plane A. Plane A may be referred to as a fixed or reference plane. Times when the samples are stored in the system memory 166 may also be recorded and saved with the samples and timestamps. The host control module 154 has ownership of the multiplexed data when stored in the system memory 166. The ownership of the data may be transferred to the network interface module 156 when the host control module 154 has finished processing the data and transfers ownership to the network interface module 156. Data in the form of frames may be transferred from the system memory 166 to the network interface module 156 via a second interface 170. As the frames are received by the network interface module 156, the frames cross plane C. The host control module 154 may signal the network interface module 156 when ownership of the data is being transferred. The network interface module 156 may then access the data from the system memory 166.

The host control module 154 may include a time management module 172 (e.g., the time management module 82 of FIG. 2). The time management module 172 may determine presentation times, predetermined MAC times, and/or generate descriptors for frames of data transferred from the system memory 166 to the network interface module 156. The descriptors may include the presentation times and the predetermined MAC times. The predetermined MAC times may include times when frames are to be forwarded to a MAC module 173 of the network interface module 156. The presentation times, the predetermined times, and/or descriptors may be generated based on a global clock signal. The presentation times may be generated in accordance with IEEE 1722. IEEE 1722 requires that talkers insert presentation times into frames of data, if the frames of data are generated based on media samples (e.g., audio data samples). The media samples may be played back at a listener and at a media clock rate of the talker 152. This allows a listener to be able to play back the frames of data without buffer underflow or overflow issues.

The presentation times for Class A data streams may be determined based on a default transmission period (e.g., 2 mSec). The default presentation period may be set based on a predetermined maximum amount of time for data to transfer through a predetermined number of hops in a network to compensate for a worst case latency of the network. As an example, the default transmission period may be equal to the latency (e.g., 2 mSec) for a Class A frame to be transferred from a talker to a listener. The duration of the default transmission period may start when the MAC module 173 receives a frame (i.e. ownership of the frame is transferred to the MAC module 173). The presentation time provided for each frame minus the default transmission period (or time that the frame should be transmitted from the MAC module) should match a time when the ownership of that frame is transferred to the MAC module 173.

A data stream may have any number of packets. Each packet may include a predetermined number of frames of data. The packets and the descriptors may be stored in the system memory 166 and provided to the network interface module 156. The frames and/or packets may be linked together via the descriptors. These descriptors help the network interface module 156 burst the frames out quickly without intervention by the host control module 154.

Each of the descriptors may also include a descriptor timestamp (referred to as a predetermined MAC time or transfer time) and/or other information, such as a size of a corresponding packet and/or frame, a start time of a periodic transmission time interval, a length of the periodic transmission time interval, and/or source and/or destination addresses. The descriptor timestamp may be in a different format than the presentation time and/or may be generated based on the presentation time. The descriptor timestamp may be valid or invalid. The descriptor timestamp or a transfer time field of a descriptor may be valid, for example, (i) when a transfer time is provided, (ii) is marked as valid, (iii) when the transfer time is in a correct format; and/or (iv) the transfer time corresponds with a presentation time such that the rate the frame is transferred and then played out matches the media rate. The descriptor may also indicate a time when: a frame is to be transferred from the system memory 166 to the network interface module 156; the frame is to be transferred to a buffer in the network interface module 156; and/or ownership of the frame is to be transferred from the host control module 154 to the network interface module 156.

The network interface module 156 may be, for example, a network interface card (NIC) or other suitable interface. A NIC refers to a card or circuit which includes a MAC module and a physical layer (PHY) device, such as the MAC module 173 and PHY device 174. The MAC module 173 and PHY device 174 may be Ethernet devices. The MAC module 173 may be time aware and include AVB queues 176, non-AVB queues 178 and associated logic devices to transmit and receive frames to and from the system memory 166. The MAC module 173 may further include gate modules and/or gates 180, the queues 176, 178, Qav shaper modules 182 (e.g., the Qav shaper modules 60, 62, 64 of FIG. 2), and/or a timing module 190 (e.g., one of the timing modules 66, 68, 70 of FIG. 2). Each of the modules and/or gates of the MAC module 173 may be time aware.

The talker 152 including the host control module 154 and the MAC module 173 provide a hardware approach to matching a transmit rate of a data stream to a media clock rate. Traditionally, a host control module of a talker when done generating and storing a frame in a system memory, transfers ownership of that frame to a network interface card (NIC). The NIC then starts processing the frame and transmitting the frame, if a corresponding output of a MAC module is idle. The gate modules and/or gates 180 may delay processing and/or transmission of frames by masking the ownership of the frames. The gate modules and/or gates 180 mask the ownership of the frames until predetermined times and/or transfer times as indicated by descriptors of the frames.

If a transfer time of a descriptor of a frame indicates the frame is valid and/or a gate module determines that the transfer time is valid, ownership of the frame may not be transferred. The ownership may not be transferred from the host control module 154 to the MAC module 173 until a local time (e.g., IEEE 802.1AS time), generated by a local clock, is equal to or greater than the transfer time of the descriptor. The timing module 190 may generate a local clock signal indicating the local time. As a result, the frames are received at the AVB queues 176 and Qav shaper modules 192 at appropriate predetermined times for media rates of the frames.

The network interface module 156 may further include a transfer module 200 and a latency detector module 202. Although the latency detector module 202 is shown as being separate from the MAC module 173 and the transfer module 200, the latency detector module 202 may be included in the MAC module 173 or the transfer module 200. The transfer module 200 may be included in the MAC module 173, include a buffer 204, and transfer frames of data from the second interface 170 to the MAC module 173. The frames cross plane B when the ownership of the frames is transferred to the MAC module 173. A plane B time may be a time when the MAC module 173 attempts to and/or enables transmission of a frame via the PHY device 174 and/or actually transmits the frame via the PHY device 174. The frame may not be transmitted, for example, if an output port of the PHY device 174 is busy. The AVB queues 176 receive the frames from the transfer module 200 based on transfer times in descriptors of the frames and then release the frames to the Qav shaper modules 192. The Qav shaper modules 192 spread the data over time, as described above. The Qav shaper modules 192 then forward the frames of data to the PHY device 174, which outputs the data to a switching network 210. The descriptors of the frames may again be timestamped when the frames (e.g., Ethernet frames) are transferred to the PHY device 174. This allows synchronization of a node of the PHY device 174 with other nodes in the switching network 210 for purposes of IEEE 802.1AS.

The latency of the switching network 210 may begin when ownership of a frame is transferred to the MAC module 173, identified as plane B. To minimize a margin of latency of the talker 152, the presentation time is inserted into each frame. The margin of latency refers to (i) difference in time between planes C and B, or (ii) a difference in time from when the host control module 154 forwards a frame to the transfer module 200 to when the frame is forwarded from the transfer module 200 to the MAC module 173. Plane B may be fixed relative to plane A, whereas plane C may vary in time relative to planes A and/or B. The latency detector module 202 monitors and adjusts the margin of latency to minimize the margin of latency. By minimizing the margin of latency, the latency detector module and/or the network interface module 156 can minimize the latency between planes A and B, which minimizes overall latency of the talker 152.

The presentation time may be set a predetermined period (e.g., 2 mSec) from when the MAC module 173 is to transmit a frame (e.g., Class A frame) to a listener. The presentation time minus the predetermined period, should match or be close to the time when ownership of the frame is transferred to the MAC module 173 (i.e., a time when the frame crosses plane B) and/or close to the time when ownership of the frame is transferred to the transfer module 200 (i.e. a time when the frame crosses plane C). This minimizes the margin of latency, which can result in reduction of the latency between planes B and C.

The IEEE 1722 standard allows for a timing uncertainty for the latency of a switching network of, for example, 125 micro-seconds (μSec). This timing uncertainty may refer to a transmission rate of a frame. For example, a frame transmission rate may be 48 kHz, which results in 8k frames per second or 125 μSec per frame. The smaller the timing uncertainty (or the more accurate the timing) of the frames, the smaller the latency of the talker 152. This accuracy can be increased when the MAC module 173 is time aware. By having the MAC module be time aware, the timing uncertainty can be reduced to, for example, 10 nano-seconds (nSec).

In addition to the time for frames to transfer from plane B to a Listener (the IEEE 1722 'presentation time'), there is time involved in the host control module 154 receiving media samples (e.g., audio samples) from digital input pins at plane A, building the frames, and transferring ownership of the frames to the MAC module 173 (plane B) via the transfer module 200. The latency detector module 202 operates to minimize the time for a frame to transfer from plane A to plane B.

Relationship of Timing Planes

The host control module 154 and the network interface module 156 operate to maintain a fixed, predetermined, and/or known relationship between plane A and plane B by setting a fixed latency between planes A and B. As an example, latency between planes A and B may be set and adjusted during testing and/or operation of the talker 152 and then maintained at a fixed value. The fixed value may be changed due to, for example, a software update in the host control module. The host control module 154 may perform various software applications, which may be audio-based. The software applications have a certain amount of processor time overhead. If a software application is changed, replaced, and/or added, the fixed value may be updated. The fixed latency between planes A and B maintains a fixed relationship between plane A and a presentation time such that the presentation time can be used in a Listener to reconstruct a media clock rate for an associated stream of data.

The IEEE 1722 standard requires that presentation times be placed into AVB Ethernet stream frames by a talker. The presentation times are times for specific samples in the AVB Ethernet frames to be moved out a predetermined period (e.g., 2 mSec) into the future. The addition of the predetermined period preserves a media clock rate of the frames since the media clock rate provides a fixed increment of time for each of the samples of the frames. The predetermined period refers to a worst case time for a frame to traverse an Ethernet network from a talker to listeners of that talker. The IEEE 1722 standard mentions when the predetermined period is to begin, at plane B in FIG. 3 or its equivalent.

In an application where audio samples are being received from a local hard drive or other storage media source, a media clock rate, as each frame is built and transmitted, may be controlled using software of the host control module 154. Because of this, the start of the predetermined period for a presentation time is a time when a frame crosses plane B. The IEEE 1722 standard defines that, for Class A streams of data, the time when ownership of an AVB frame is transferred to a MAC module is to be the presentation time of the frame minus the predetermined period and be within the associated accuracy of timing uncertainty. This is can be accomplished by using a time aware MAC module.

In the example application of FIG. 3, the timestamps on the audio samples refer to times when the samples cross plane A. The start of corresponding presentation times is made at plane B. To preserve integrity of the associated media clock rate for the samples, the relationship in time between planes A and B is maintained at a fixed amount of time. While this can be accomplished using a time aware MAC module, a time aware MAC module is not capable of determining a minimum worst case amount of latency time between planes A and B to minimize latency of a talker while preventing frames from arriving late.

Minimizing latency includes minimizing the amount of time for a sample to transfer from plane A to plane B. Since the time associated with processing samples and building corresponding frames is performed using software of the host control module 154, and since the host control module 154 may execute multiple software applications during the same period of time and as a result may interrupt the building of the frames, the time to complete processing of the samples can vary and be unpredictable. The host control module 154 may receive interrupts during processing of the samples or may be busy performing other tasks, which can cause large variations in processing time. A maximum processing time (or minimum worst case processing time) varies depending on the number and type of software applications being executed and/or other operations being performed by the host control module 154.

To facilitate discovery of the minimum worst cast processing time between plane A and plane B, latency detector logic is provided via the latency detector module 202. The latency detector module 202 measures latency time between points of the talker 152, such as time between planes A and B, between planes A and C, and/or between C and B. Plane A refers to when samples are initially timestamped. Plane C refers to when the host control module 154 has completed processing of frames for the samples and/or has transferred the frames to the transfer module 200. Plane B refers to when the frames are transferred to the MAC module 173, which may be indicated in descriptors of the frames. Frames that have a valid transfer time are held and not 'seen' in the MAC module 173 until the frames cross plane B. This synchronizes the presentation times of the frames with the respective plane B times.

Figure 4:
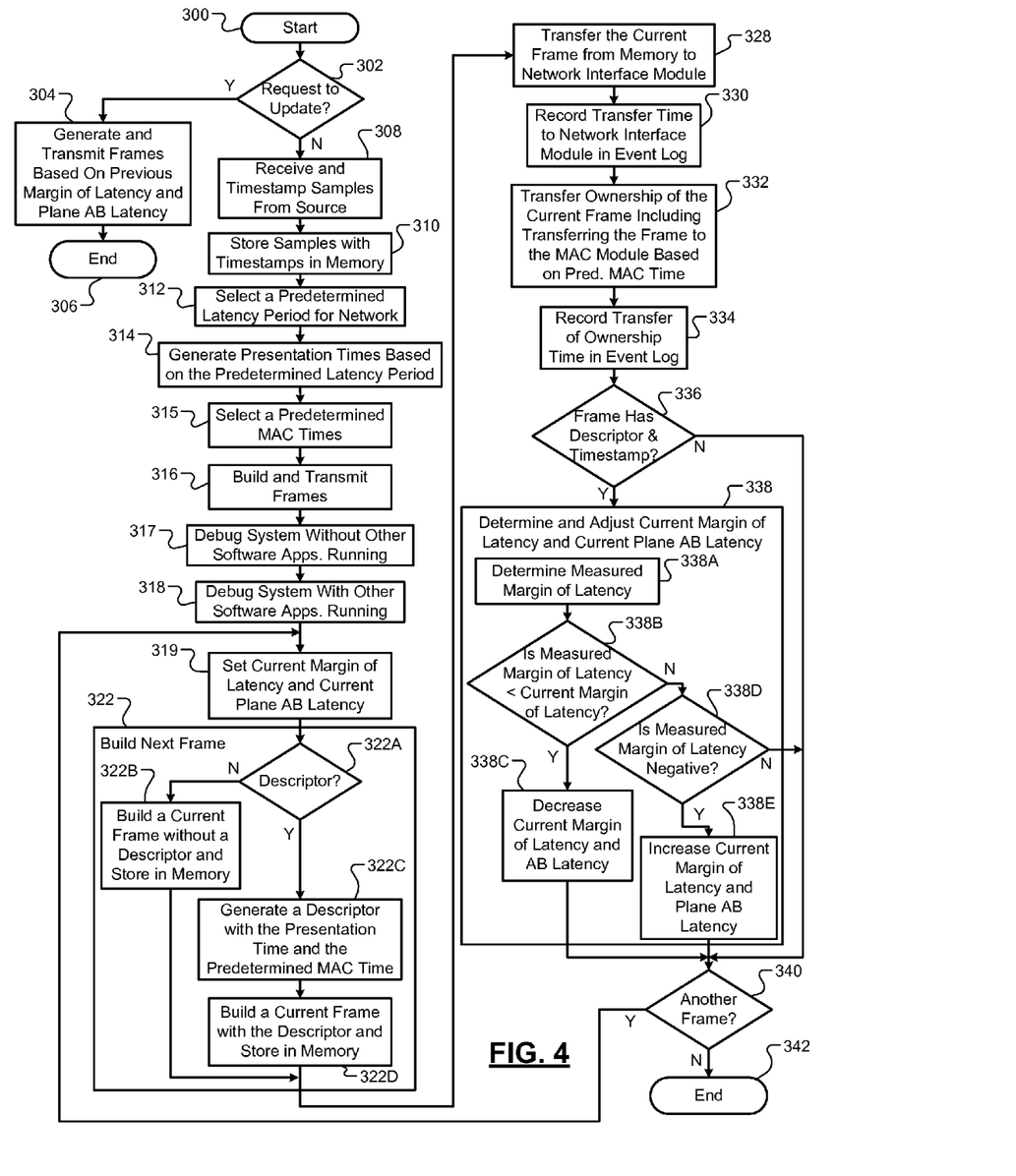
FIG. 4 illustrates a method of adjusting margins of latency and latencies between planes A and B within a talker and in accordance with an embodiment of the present disclosure.

The latency detector module 202 as described with respect to the method of FIG. 4 operates to assure that processing completion times of frames occur prior to and as close to times when the frames are transferred to the MAC module 173 without the frames arriving late to the MAC module 173. A frame arrives late to the MAC module 173 when the time the frame is received at the MAC module 173 is later than the predetermined or expected time for that frame to be received at the MAC module 173. The predetermined or expected time can be inserted in a descriptor of the frame by the host control module 154. As a result, the latency detector module 202 fine tunes a completed system of a talker in order to minimize latency of the completed system.

The latency detector module 202 can verify if frames entered the MAC module 173 at a correct time and adjust margins of latency and/or latency of a frame between planes A and B (referred to as plane AB latency) accordingly. If the latency detector module 202 is disabled and/or frames arrive to the MAC module 173 late, this can disturb playout of the frames at a listener. The latency detector module 202 assures that a final product (or talker system) passes operating requirements during testing and also does not fail or exhibit late frame arrival times after installation and/or during use of the product. The latency detector module 202 performs these verifications and adjustments without added latency between planes A and B.

The talkers disclosed herein may be operated using numerous methods, an example method is illustrated in FIG. 4. FIG. 4 shows a method of adjusting latencies and margins of latency within a talker. The method of FIG. 4 includes receiving data samples at plane A, building IEEE 1722 frames and assuring the frames egress plane B at corresponding presentation times of the frames minus a predetermined latency period. The predetermined latency period and latency between planes A and B may be determined and/or set based on the class of traffic being transferred. Although the following tasks are primarily described with respect to the implementations of FIGS. 1-3, the tasks may be easily modified to apply to other implementations of the present disclosure. The tasks may be iteratively performed.

The method may begin at 300. At 302, the host control module 154 determines whether to update the margin of latency and plane AB latency of the talker 152. This may be based on a received request to perform an update. The update may be performed when there is a change in a number of software applications, number of software applications being executed, and/or a software application has been changed. The update may be performed during testing of the talker 152, at an initial startup of the talker, and/or during operation of the talker 152. If an update is not to be performed, task 304 is performed, otherwise task 308 is performed.

At 304, the host control module 154 may receive samples, generate frames, and forward frames to the network interface module 156 based on a previously determined (or current) margin of latency and a previously determined (or current) plane AB latency. Subsequent to task 304, the method may end at 306.

The following tasks 308-318 may not be performed if the system of the talker 152 has already been debugged, as described in tasks 317, 318. Also, during the following tasks, software overhead of the host control module 154 is unchanged. This allows the latency detector module 202 to measure the performance of the host control module 154 to allow tuning of the margins of latency and plane AB latency.

At 308, the receiving module 162 and/or the TDM 164 may receive samples from a data source and timestamp the samples as the samples are received. This may be accomplished by applying a timestamp to each sample as the samples enter a pin of a device at plane A. A local clock time (referred also to as a local hardware time) can be used to timestamp the samples. By knowing the time each sample arrives, a corresponding media clock rate of the samples can be determined.

At 310, the receiving module 162 and/or the TDM 164 stores the samples and timestamps in the system memory 166. The timestamps may be included in an event log, which is stored in the system memory 166 or elsewhere in the talker 152.

At 312, the host control module 154 determines a predetermined latency period (e.g., 2 mSec) for a network. This may be adjusted based on the network over which the frames are to be transmitted to a listener.

At 314, the host control module 154 may generate presentation times for one or more frames. At 315, the host control module 154 selects predetermined MAC times, which identify times that the frames are expected to be transferred to the MAC module 173.

At 316, the frames may be built and transmitted. The frames may include descriptors. The host control module 154 may generate descriptors as described above to include the presentation times and the predetermined MAC times. The frames and/or descriptors may be modified to include the presentation times.

At 317, the system of the talker is fully debugged until the frames are generated and transmitted without failures and/or without late transmission of frames. This may be controlled by the host control module 154, the network interface module 156 and/or a dedicated debugging module. The debugging module may be in communication with the host control module 154 and the network interface module 156. During task 317, the host control module may not be executing software applications other than the software application used to build and transfer the frames.

At 318, the software application to build and transfer the frames is fully integrated with other software applications in the system of the talker 152 and the system is again fully debugged. This may be controlled by the host control module 154, the network interface module 156 and/or the dedicated debugging module. During task 318, all supported software applications of the host control module 154 may be running.

Subsequent to task 318, the latency detector module 202 may tune and/or verify the plane AB latency and the margin of latency. This may be done by performing tasks 319-340.

At 319, a current margin of latency and a current plane AB latency may be referred to as predetermined latency periods and may be selected, set and/or determined. The current margin of latency and current plane AB latency may be set to maximum values, to previously determined values, and/or to predetermined default values. As an example, a maximum current plane AB latency may be 500 μSec. The current margin of latency and current plane AB latency may be initially set large or at maximum values such that plane B times are sufficiently set into the future from plane A times to prevent frames from being late. The values of the current margin of latency and current plane AB latency may be set as 'best estimates' and then later adjusted to minimize system latency.

As an example, the current margin of latency and current plane AB latency may be stored in respective registers (e.g., 32 bit registers) of memory and set to a maximum positive numbers at a beginning of a test or latency evaluation and adjustment process, as provided in FIG. 4. The size and accuracy of the registers may be predetermined and based on the application of use. The registers may be located in the system memory 166, the latency detector module 202, the network interface module 156 or elsewhere in the talker 152.

The system of the talker may then be operated in an intended application for an extended period of time to tune the current margin of latency and current plane AB latency. This may include iteratively repeating tasks 319-340. All features/functions of the system of the talker 152 may be running while frames (e.g., AVB frames) are being transmitted. The latency detector module 202 may be enabled subsequent to task 318 or 319. The following tasks 322-340 may be performed in hardware and/or software of the network interface module 156 whenever a frame is to be built and provided from the host control module 154 to the transfer module 200 by (i.e., the frame is passed over plane C):

Although not shown in FIG. 4, tasks 308-315 may be repeated subsequent to task 318 and prior to the building of each frame. Tasks 308-315 may be performed for one or more frames.

At 322, the transfer module 200 and/or the latency detector module 202 determines whether a next or current frame is to have a descriptor. A frame may not have a descriptor for various reasons, such as to reduce latencies and/or save storage space. If the frame does not have a descriptor, task 322B is performed, otherwise task 322C is performed.

At 322B, the host control module 154 builds a current frame without a descriptor and stores the frame in the system memory 166.

At 322C, the host control module 154 generates a descriptor to include the presentation time and the predetermined MAC time. The predetermined MAC time may be referred to as a timestamp identifying when ownership of the frame is to transfer to the MAC module 173. At 322D, the host control module builds a current frame with the descriptor and stored the frame in the system memory 166.

At 328, the host control module 154 determines whether to transfer ownership of the current frame from the host control module 154 to the MAC module 173. This may include delaying the frame to effectively provide gating of the frame. The host control module 154 transfers ownership of the frame based on the gating performed. The host control module 154 may signal the transfer module 200 and/or the MAC module 173 when ownership of a frame has been transferred to the transfer module 200. The transfer module 200 may access the frame from the system memory 166 based on the gating and store the frame in the buffer 204. The transfer module 200 may have multiple queues. The frame may be stored in a selected one of the queues. At 330, the latency detector module 202 may record the time that the frame is transferred to the transfer module 200 in the event log.

At 332, the transfer module 200 may transfer the frame to the MAC module 173 based on the predetermined MAC time in a descriptor of the frame, if the frame has a descriptor and the descriptor has the predetermined MAC time. At 334, the latency detector module 202 may record the time that the frame is transferred to the MAC module 173 in the event log.

At 336, the transfer module 200 may determine whether the frame has a descriptor with a predetermined MAC time. If a descriptor with a predetermined MAC time is included in the frame, the margin of latency is measured and task 338 is performed, otherwise the margin of latency is not measured and task 340 is performed.

At 338, the latency detector module 202 determines a measured margin of latency and a measured plane AB latency and may adjust the current (or previous) margin of latency and the current (or previous) plane AB latency. At 338A, the latency detector module 202 determines the measured margin of latency for the current frame based on the times in the event log. For example, the latency detector module 202 may subtract (i) the time the frame crossed plane C (or was transferred to the network interface module 156 or the transfer module 200) from (ii) the predetermined MAC time of the descriptor (or the time the frame crossed plane B). The result of this subtraction is the measured margin of latency for the current frame, which may be added to the event log. This result is the amount of time the host control module 154 was early (i.e. the amount of time the current frame was received at the transfer module 200 before the MAC module 173 was expected to receive the current frame. If the result is negative, the current frame was received at the MAC module 173 late. The result is not based on whether the MAC module 173 transmitted the current frame upon receipt of the current frame. The MAC module 173 may have simply 'tried to' transmit the frame as a port of the PHY device 174 may be busy transmitting another frame when the current frame is transferred to the Qav shaper device 192.

At 338B, the latency detector module 202 compares the measured margin of latency to the previous margin of latency and determines whether the measured margin of latency is less than the previously stored margin of latency. If the current margin of latency is less than the previously stored margin of latency, task 338C is performed; otherwise task 338D is performed.

At 338C, the latency detector module 202 sets the previous margin of latency to be equal to the measured margin of latency. After each iteration of tasks 318-340 or after a predetermined number of iterations of tasks 318-340, the current plane AB latency may be updated. In one implementation, the current plane AB latency is decreased by a first predetermined amount. In another implementation, the current plane AB latency is decreased by a sum of the measured margin of latency and a second predetermined amount. The second predetermined amount provides a 'cushion' of time to prevent a future frame from arriving late due to the margin of latency being set too small. The second predetermined amount may be as small as zero. The measured (or updated) margin of latency and the updated plane AB latency may be added to the event log. In another implementation, the current margin of latency and the current plane AB latency is adjusted based on one or more of each of the following: plane A times, plane B times, plane C times, previous margins of latency, and/or previous plane AB latencies.

At 338D, if the measured margin of latency is negative, an interrupt may be generated and provided to the host control module 154 to change the current plane AB latency and thus predetermined MAC times (or times frames cross plane B relative to corresponding plane A timestamps). The interrupt may be generated when the measured margin of latency is negative for one frame or for multiple frames. A predetermined number of negative measured margins of latency may be exceeded prior to the generation of an interrupt.

At 338E, the latency detector module 202 may increase the previous margin of latency. After each iteration of tasks 318-340 or after a predetermined number of iterations of tasks 318-340, the current plane AB latency may be updated. In one implementation, the current plane AB latency is increased by a third predetermined amount. In another implementation, the current plane AB latency is increased by a sum of the measured margin of latency and a fourth predetermined amount. The fourth predetermined amount provides a 'cushion' of time to prevent a future frame from arriving late due to the margin of latency being set too small. The fourth predetermined amount may be as small as zero. The measured (or updated) margin of latency and the updated plane AB latency may be added to the event log. In another implementation, the current margin of latency and the current plane AB latency is adjusted based on one or more of each of the following: plane A times, plane B times, plane C times, previous margins of latency, and/or previous plane AB latencies.

At 340, the host control module 154 and/or the transfer module 200 determines whether there is another frame to transfer. If there is another frame, task 322 may be performed or as shown task 319 may be performed. If there is not another frame, the method may end at 342.

Although the above method is described such that positive values refer to early arrival of frames to the MAC module 173 and negative values refer to late arrive of frames to the MAC module 173, the method may be modified such that positive values refer to late frame arrivals and negative values refer to early frame arrivals.

The above-described tasks are meant to be illustrative examples; the tasks may be performed sequentially, synchronously, simultaneously, continuously, during overlapping time periods or in a different order depending upon the application. Also, any of the tasks may not be performed or skipped depending on the implementation and/or sequence of events.

Although a single latency detector module is shown in FIG. 4, the network interface module 156 may include a latency detector module for each transmit queue of the MAC module 173. This provides independent measurement of margins of latency for each transmit path of the MAC module 173. The margins of latency may be used to update corresponding plane AB latencies for each of the queues. The queues of the MAC module 173 may transmit frames to one or more PHY devices during the same time period.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

In this application, including the definitions below, the term module may be replaced with the term circuit. The term module may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term code, as used above, may include software, firmware, and/or microcode, and may refer to programs, routines, functions, classes, and/or objects. The term shared processor encompasses a single processor that executes some or all code from multiple modules. The term group processor encompasses a processor that, in combination with additional processors, executes some or all code from one or more modules. The term shared memory encompasses a single memory that stores some or all code from multiple modules. The term group memory encompasses a memory that, in combination with additional memories, stores some or all code from one or more modules. The term memory may be a subset of the term computer-readable medium. The term computer-readable medium does not encompass transitory electrical and electromagnetic signals propagating through a medium, and may therefore be considered tangible and non-transitory. Non-limiting examples of a non-transitory tangible computer readable medium include nonvolatile memory, volatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

What is claimed is:

1. A first network device comprising:
    a receiving module configured to receive samples of data transferred from a data source to the first network device;
    a memory configured to store (i) the samples of data, and (ii) timestamps when the data was sampled;
    a medium access control module;
    a host module configured to build a frame based on one of the timestamps and a first predetermined latency period between (i) the one of the timestamps and (ii) a timestamp in a descriptor of the frame, wherein the frame includes the samples of data and the descriptor, and wherein the timestamp in the descriptor indicates a time when the frame is expected to be received by the medium access control module;
    a transfer module configured to transfer the frame to the medium access control module according to the timestamp in the descriptor,
    wherein the host module is configured to forward the frame to the transfer module; and
    a latency detector module configured to determine a margin of latency based on a difference between (i) a time when the host module forwards the frame to the transfer module and (ii) a time when the frame is received at the medium access control module, wherein the latency detector module updates the first predetermined latency period based on the determined margin of latency.

2. The first network device of claim 1, wherein:
    the host module is configured to store the frame in the memory; and
    the transfer module is configured to access the frame from the memory, and transfer the frame to the medium access control module.

3. The first network device of claim 1, wherein:
    the host module is configured to build the frame such that the descriptor includes a presentation time; and
    the presentation time indicates a time (i) when a medium access control module of a second network device is expected to receive the frame, or (ii) subsequent to when the medium access control module of the second network device of a system is expected to receive the frame, wherein the second network device is separate from the first network device.

4. The first network device of claim 1, wherein:
    the host module is configured to initially set the first predetermined latency period to a maximum value;
    the latency detector module is configured to (i) determine margins of latency respectively for a plurality of frames, and (ii) update the first predetermined latency period based on the margins of latency respectively determined for the plurality of frames; and
    each of the margins of latency respectively determined for the plurality of frames is based on a difference between (i) a time subsequent to when the host module has finished building a respective frame and (ii) a time when the respective frame is received at the medium access control module.

5. The first network device of claim 1, wherein:
    the host module is configured to set the timestamp in the descriptor of the frame based on a second predetermined latency period;
    the second predetermined latency period is an amount of time between (i) the one of the timestamps and (ii) the time when the frame is expected to be received at the medium access control module; and
    the latency detector module is configured to adjust the second predetermined latency period based on the determined margin of latency.

6. The first network device of claim 5, wherein the latency detector module is configured to, in response to the determined margin of latency being less than the first predetermined latency period, decrease the first predetermined latency period and the second predetermined latency period.

7. The first network device of claim 5, wherein the latency detector module is configured to, in response to the determined margin of latency being greater than the first predetermined latency period, increase the first predetermined latency period and the second predetermined latency period.

8. The first network device of claim 1, wherein the host module is configured to timestamp a plurality of descriptors for a plurality of frames based on the first predetermined latency period.

9. The first network device of claim 1, wherein the latency detector module is configured to:
    record margins of latency respectively for a plurality of frames;
    record times when the plurality of frames are received by the medium access control module; and subsequent to recording the margins of latency respectively for the plurality of frames and the times when the plurality of frames are received by the medium access control module, adjust the first predetermined latency period based on (i) the margins of latency recorded respectively for the plurality of frames, and (ii) the times when the plurality of frames are received by the medium access control module.

10. The first network device of claim 1, wherein:
at least one of the host module or a network interface module is configured to debug a system (i) during testing of a first software application, and (ii) while the host module is executing the first software application and a second software application;
the host module is configured to building a first plurality of frames while executing the first software application;
the latency detector module is configured to adjust the first predetermined latency period during the testing of the first software application based on latency periods of the first plurality of frames; and
subsequent to the testing of the first software application, the host module is configured to build each of a second plurality of frames according to the first predetermined latency period and independent of whether the second software application is being executed.

11. A method comprising:
receiving, at a network device, samples of data transferred from a data source to the network device;
storing, in a memory of the network device, (i) the samples of data, and (ii) timestamps when the data was sampled;
building a frame at a host module of the network device based on one of the timestamps and a first predetermined latency period between (i) the one of the timestamps and (ii) a timestamp in a descriptor of the frame, wherein the frame includes the samples of data and the descriptor, and wherein the timestamp in the descriptor indicates a time when the frame is expected to be received by a medium access control module of the network device;
forwarding, via the host module, the frame to a transfer module in the network device;
transferring the frame from the transfer module to the medium access control module according to the timestamp in the descriptor;
determining a margin of latency based on a difference between (i) a time when the host module forwards the frame to the transfer module and (ii) a time when the frame is received at the medium access control module; and
updating the first predetermined latency period based on the determined margin of latency.

12. The method of claim 11, wherein a network interface module includes the medium access control module.

13. The method of claim 11, further comprising:
initially setting the first predetermined latency period to a maximum value;
measuring margins of latency respectively for a plurality of frames; and
updating the first predetermined latency period based on the margins of latency respectively determined for the plurality of frames, wherein each of the margins of latency respectively determined for the plurality of frames is based on a difference between (i) a time when the host module forwards a corresponding one of the plurality of frames to the transfer module and (ii) a time when the corresponding one of the plurality of frames is received at the medium access control module.

14. The method of claim 11, further comprising:
setting the timestamp in the descriptor of the frame based on a second predetermined latency period, wherein the second predetermined latency period is an amount of time between (i) the one of the timestamps and (ii) the time when the frame is expected to be received at the medium access control module; and
adjusting the second predetermined latency period based on the determined margin of latency.

15. The method of claim 14, further comprising, in response to the determined margin of latency being less than the first predetermined latency period, decreasing the first predetermined latency period and the second predetermined latency period.

16. The method of claim 14, further comprising, in response to the determined margin of latency being greater than the first predetermined latency period, increasing the first predetermined latency period and the second predetermined latency period.

17. The method of claim 11, wherein the host module is configured to timestamp a plurality of descriptors for a plurality of frames based on the first predetermined latency period.

18. The method of claim 11, further comprising:
recording margins of latency respectively for a plurality of frames;
recording times when the plurality of frames are received by the medium access control module; and
subsequent to recording the margins of latency respectively for the plurality of frames and the times when the plurality of frames are received by the medium access control module, adjusting the first predetermined latency period based on (i) the margins of latency respectively for the plurality of frames, and (ii) the times when the plurality of frames are received by the medium access control module.

19. The method of claim 11, further comprising:
debugging a system that includes the host module and the medium access module (i) during testing of a first software application, and (ii) while the host module is executing the first software application and a second software application;
building a first plurality of frames via the host module and while executing the first software application;
adjusting the first predetermined latency period during the testing of the first software application based on latency periods of the first plurality of frames; and
subsequent to the testing of the first software application, build each of a second plurality of frames according to the first predetermined latency period and independent of whether the second software application is being executed.

* * * * *